US010608869B2

(12) United States Patent
Pan et al.

(10) Patent No.: US 10,608,869 B2
(45) Date of Patent: Mar. 31, 2020

(54) HANDLING CONTROL-PLANE CONNECTIVITY LOSS IN VIRTUALIZED COMPUTING ENVIRONMENTS

(71) Applicant: Nicira, Inc., Palo Alto, CA (US)

(72) Inventors: Feng Pan, Beijing (CN); Jingfeng Zhang, Beijing (CN); Caixia Jiang, Beijing (CN); Jianjun Shen, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/462,918

(22) Filed: Mar. 20, 2017

(65) Prior Publication Data

US 2018/0270105 A1  Sep. 20, 2018

(51) Int. Cl.
*H04L 12/24* (2006.01)
*H04L 12/26* (2006.01)
*H04L 29/08* (2006.01)

(52) U.S. Cl.
CPC ...... *H04L 41/0668* (2013.01); *H04L 43/0811* (2013.01); *H04L 67/1046* (2013.01); *H04L 67/1053* (2013.01)

(58) Field of Classification Search
None
See application file for complete search history.

(56) References Cited

U.S. PATENT DOCUMENTS

| | | | |
|---|---|---|---|
| 2002/0156875 A1* | 10/2002 | Pabla | H04L 1/24 709/220 |
| 2008/0117861 A1* | 5/2008 | Balandina | H04L 67/16 370/328 |
| 2009/0177772 A1* | 7/2009 | Guan | H04L 61/1582 709/224 |
| 2009/0323696 A1* | 12/2009 | Schwan | H04L 67/104 370/395.31 |
| 2011/0060843 A1* | 3/2011 | Shim | H04L 12/42 709/238 |
| 2011/0111755 A1* | 5/2011 | Chen | H04W 36/0061 455/434 |
| 2011/0231491 A1* | 9/2011 | Hautakorpi | H04L 29/12094 709/204 |
| 2013/0136120 A1* | 5/2013 | Wu | H04L 67/1065 370/352 |
| 2016/0099890 A1* | 4/2016 | Kaufman | H04L 61/2575 709/203 |
| 2016/0156504 A1* | 6/2016 | Wang | H04L 41/0695 370/217 |

(Continued)

*Primary Examiner* — Chirag G Shah
*Assistant Examiner* — Amarnauth G Persaud
(74) *Attorney, Agent, or Firm* — Su IP Consulting (57) ABSTRACT

Example methods are provided for a first host to handle control-plane connectivity loss in a virtualized computing environment that includes the first host, multiple second hosts and a network management entity. The method may comprise: detecting a loss of control-plane connectivity between the first host and the network management entity; and generating a request message for control information that the first host is unable to obtain from the network management entity. The method may also comprise sending the request message via a peer-to-peer network that connects the first host with the multiple second hosts; and obtaining the control information from a response message that is sent by at least one of the multiple second hosts.

12 Claims, 8 Drawing Sheets

(56) References Cited

U.S. PATENT DOCUMENTS

2016/0197831 A1* 7/2016 De Foy ............... H04L 45/7453
                                                    370/392
2016/0235711 A1* 8/2016 Beard ................... C07C 275/30

* cited by examiner

HANDLING CONTROL-PLANE CONNECTIVITY LOSS IN VIRTUALIZED COMPUTING ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Data Center (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc.

Further, through network virtualization, benefits similar to server virtualization may be derived for networking services in the SDDC. For example, multiple logical networks with different rules and policies may be supported by the same physical network. In this case, control information relating to logical networks and overlay transport tunnels may be collected and disseminated using a network management entity, such as a Software-Defined Network (SDN) controller. In practice, however, a host may lose control-plane connectivity with the network management entity, in which case the host will not be able to obtain the latest control information.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to control-plane connectivity will now be explained in more detail using FIG. 1, which is a schematic diagram illustrating example virtualized computing environment 100 in which control-plane connectivity loss may be handled. It should be understood that, depending on the desired implementation, virtualized computing environment 100 may include additional and/or alternative components than that shown in FIG. 1.

Figure 1:
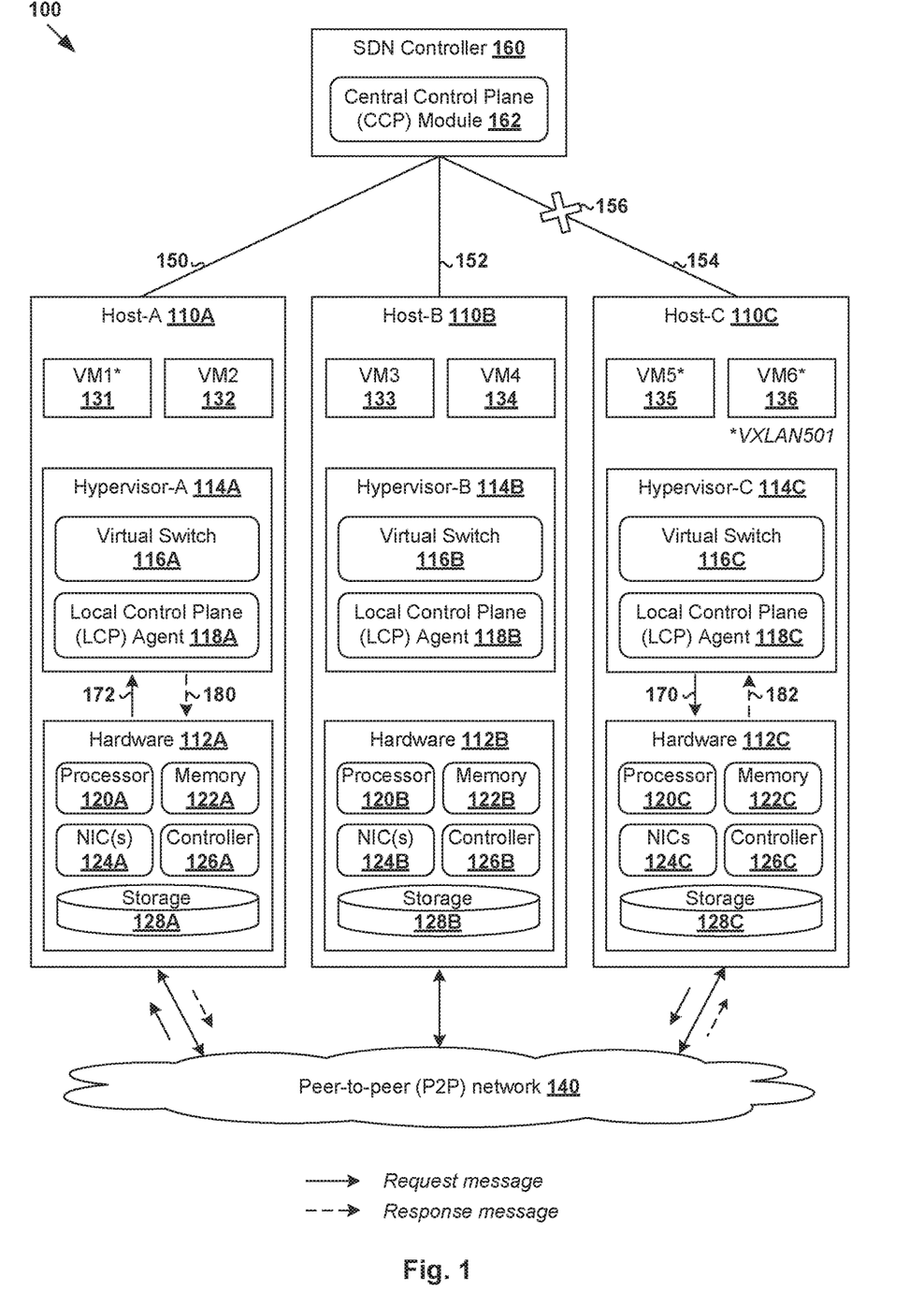
FIG. 1 is a schematic diagram illustrating an example virtualized computing environment in which control-plane connectivity loss may be handled.

In the example in FIG. 1, virtualized computing environment 100 includes multiple hosts, such as host-A 110A, host-B 110B and host-C 110C. Each host 110A/110B/110C includes suitable hardware 112A/112B/112C and virtualization software (e.g., hypervisor-A 114A, hypervisor-B 114B, hypervisor-C 114C) to support various virtual machines. For example, host-A 110A supports VM1 131 and VM2 132; host-B 110B supports VM3 133 and VM4 134; and host-C 110C supports VM5 135 and VM6 136. In practice, virtualized computing environment 100 may include any number of hosts (also known as a "computing devices", "host computers", "host devices", "physical servers", "server systems", etc.), where each host may be supporting tens or hundreds of virtual machines.

Although examples of the present disclosure refer to virtual machines 131-136, it should be understood that a "virtual machine" running on host 110A/110B/110C is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computational environments, containing virtual equivalents of the hardware and software components of a physical computing system. The term "hypervisor" may refer generally to a software layer or component that supports the execution of multiple virtualized computing instances, including system-level software that supports namespace containers such as Docker, etc.

Hypervisor 114A/114B/114C maintains a mapping between underlying hardware 112A/112B/112C and virtual resources allocated to respective virtual machines 131-136. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications. For example, corresponding to hardware 112A/112B/112C, the virtual resources may include virtual CPU, virtual memory, virtual disk, virtual network interface controller (VNIC), etc. Hypervisor 114A/114B/114C further implements virtual switch 116A/116B/116C to handle egress packets from, and ingress packets to, respective virtual machines 131-136. The term "packet"

may refer generally to a group of bits that can be transported together from a source to a destination, such as message, segment, datagram, etc.

SDN controller 160 is a "network management entity" that facilitates network virtualization in virtualized computing environment 100. Through network virtualization, logical networks may be provisioned, changed, stored, deleted and restored programmatically without having to reconfigure the underlying physical hardware. SDN controller 160 may be implemented using physical machine(s), virtual machine(s), or both. One example of an SDN controller is the NSX controller component of VMware NSX® (available from VMware, Inc.) that operates on a central control plane. SDN controller 160 may be a member of a controller cluster (not shown) that is configurable using an SDN manager.

Logical networks may be formed using any suitable tunneling protocol, such as Virtual eXtension Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. To facilitate communication among members of a logical network, hypervisor 114A/114B/114C implements a virtual tunnel endpoint (VTEP) to encapsulate and decapsulate packets with a tunnel header identifying the logical network. For example in FIG. 1, VM1 131 on host-A 110A, as well as VM5 135 and VM6 136 on host-C 110C, are configured as members of a VXLAN logical network (e.g., VXLAN501). To facilitate data-plane communication between source VM1 131 to destination VM5 135, hypervisor-A 114A encapsulates each data packet with a tunnel header that identifies VXLAN network identifier (VNI)=501, a source VTEP implemented by hypervisor-A 114A and a destination VTEP implemented by hypervisor-C 114C. At the destination, the tunnel header is then removed by hypervisor-C 114C before the data packets are delivered to VM5 135.

SDN controller 160 is responsible for collecting and disseminating control information relating to logical networks and overlay transport tunnels, etc. To send and receive the control information, local control plane (LCP) agent 118A/118B/118C on host 110A/110B/110C requires control-plane connectivity 150/152/154 with central control plane (CCP) module 162 at SDN controller 160. Here, the term "control-plane connectivity" may refer generally the ability of SDN controller 160 and host 110A/110B/110C to communicate with each other, such as over a management network. To provide the control-plane connectivity, a control channel may be established between SDN controller 160 and host 110A/110B/110C using any suitable protocol, such as using Transmission Control Protocol (TCP) over Secure Sockets Layer (SSL), etc.

In practice, however, host 110A/110B/110C may lose control-plane connectivity 150/152/154 with SDN controller 160. For example, in a multi-site data center, host-C 110C located at one site might lose control-plane connectivity (see 156 in FIG. 1) with SDN controller 160 located in at different site. Due to such disruption, host-C 110C will operate in a "headless mode" without the ability to send and receive the latest control information. When updated control information such as rules and policies are disseminated by SDN controller 160 to other hosts that still have control-plane connectivity, host-C 110C will become out of synchronization, resulting in performance degradation of host-C 110C as well as associated logical network(s).

Handling Control-Plane Connectivity Loss

According to examples of the present disclosure, resilience and robustness against the loss of control-plane connectivity with SDN controller 160 may be improved. Instead of waiting for the control-plane connectivity to be restored, a host (e.g., host-C 110C) operating in a headless mode may obtain control information via peer-to-peer (P2P) network 140 connecting multiple hosts. This way, the host may continue to perform various functionalities based on the obtained control information, thereby reducing the likelihood of performance degradation due to out-of-synchronization.

Figure 2:
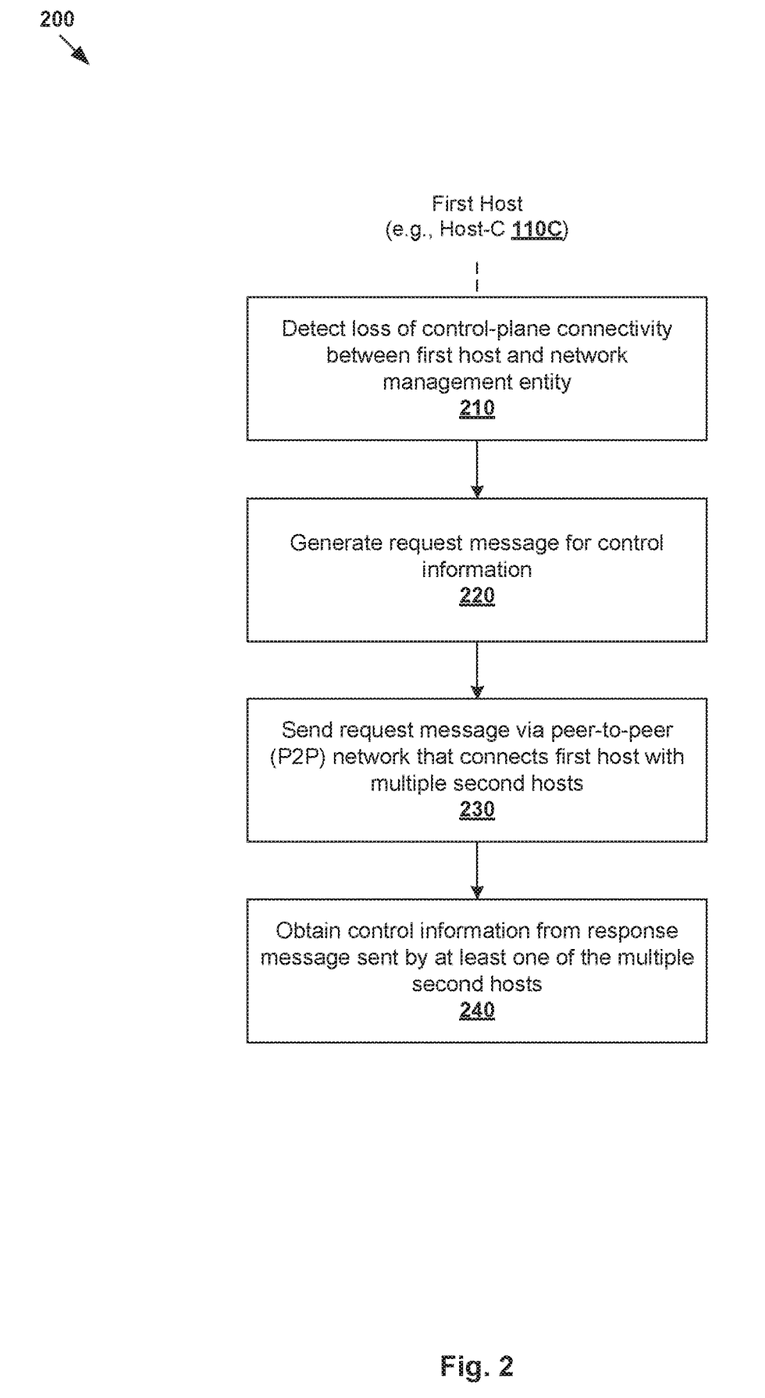
FIG. 2 is a flowchart of an example process for a first host to handle control-plane connectivity loss in a virtualized computing environment.

In more detail, FIG. 2 is a flowchart of example process 200 for a first host to handle control-plane connectivity loss in virtualized computing environment 100. Example process 200 may include one or more operations, functions, or actions illustrated by one or more blocks, such as 210 to 240. The various blocks may be combined into fewer blocks, divided into additional blocks, and/or eliminated depending on the desired implementation. In practice, example process 200 may be implemented by host 110A/110B/110C using LCP agent 118A/118B/118C supported by hypervisor 114A/114B/114C. In the following, an example will be explained using host-C 110C as an example "first host"; host-A 110A and host-B 110B as example "second hosts"; and SDN controller 160 as an example "network management entity."

At 210 in FIG. 2, host-C 110C detects a loss of control-plane connectivity between host-C 110C and SDN controller 160 (see 156 in FIG. 1). At 220 in FIG. 2, host-C 110C generates a request message for control information that host-C 110C is unable to obtain from SDN controller 160. For example, the control information may be related to logical networks and overlay transport tunnels in virtualized computing environment 100, such as logical network topology, logical network membership information, hardware-to-VTEP address mapping information, protocol-to-hardware address mapping information, distributed firewall rules and policies applicable to a logical network, etc.

At 230 in FIG. 2, host-C 110C sends the request message (see 170 in FIG. 1) via P2P network 140 that connects host-C 110C with host-A 110A and host-B 110B. In the example in FIG. 1, host-A 110A is able to satisfy the request message (see 172 in FIG. 1) and replies with a response message with the control information (see 180 in FIG. 1). At 240 in FIG. 2, host-C 110C updates control information based on a response message from host-A 110A (see 182 in FIG. 1).

As used herein, the term "peer-to-peer network" may refer generally to a distributed network architecture via which multiple hosts may interact with each other (e.g., to send and/or receive control information) without the need for central coordination by a central authority such as SDN controller 160. Each host on P2P network 140 may act as a "client" to request for control information from other hosts, or as a "server" to send control information to other hosts. As will be described further using FIG. 3 to FIG. 8, one example of a P2P network is a chord network having a ring topology. Depending on the desired implementation in practice, any alternative P2P architecture may be used, such as pastry, content addressable network (CAN) and tapestry (all three are implementations of a distributed hash table similar to chord), etc.

Using example process 200, host-C 110C in FIG. 1 is provided with a fault tolerance mechanism to use P2P network 140 for control information updates when there is a loss of control-plane connectivity with SDN controller 160. In practice, P2P network 140 may also be used for pushing control information to other hosts. For example, as will be explained using FIG. 8, in response to detecting an event that causes an update to the control information, host-C 110C may generate and send a proactive report message to other hosts (e.g., host-A 110A and host-B 110B). This facilitates control information synchronization among hosts using P2P network 140.

In the following, various examples will be explained using FIG. 3 to FIG. 8. Examples for joining P2P network 140 will be explained using FIG. 3 and FIG. 4, example request and response messages using FIG. 5, FIG. 6 and FIG. 7, and example proactive report messages using FIG. 8.

Joining P2P Network

Figure 3:
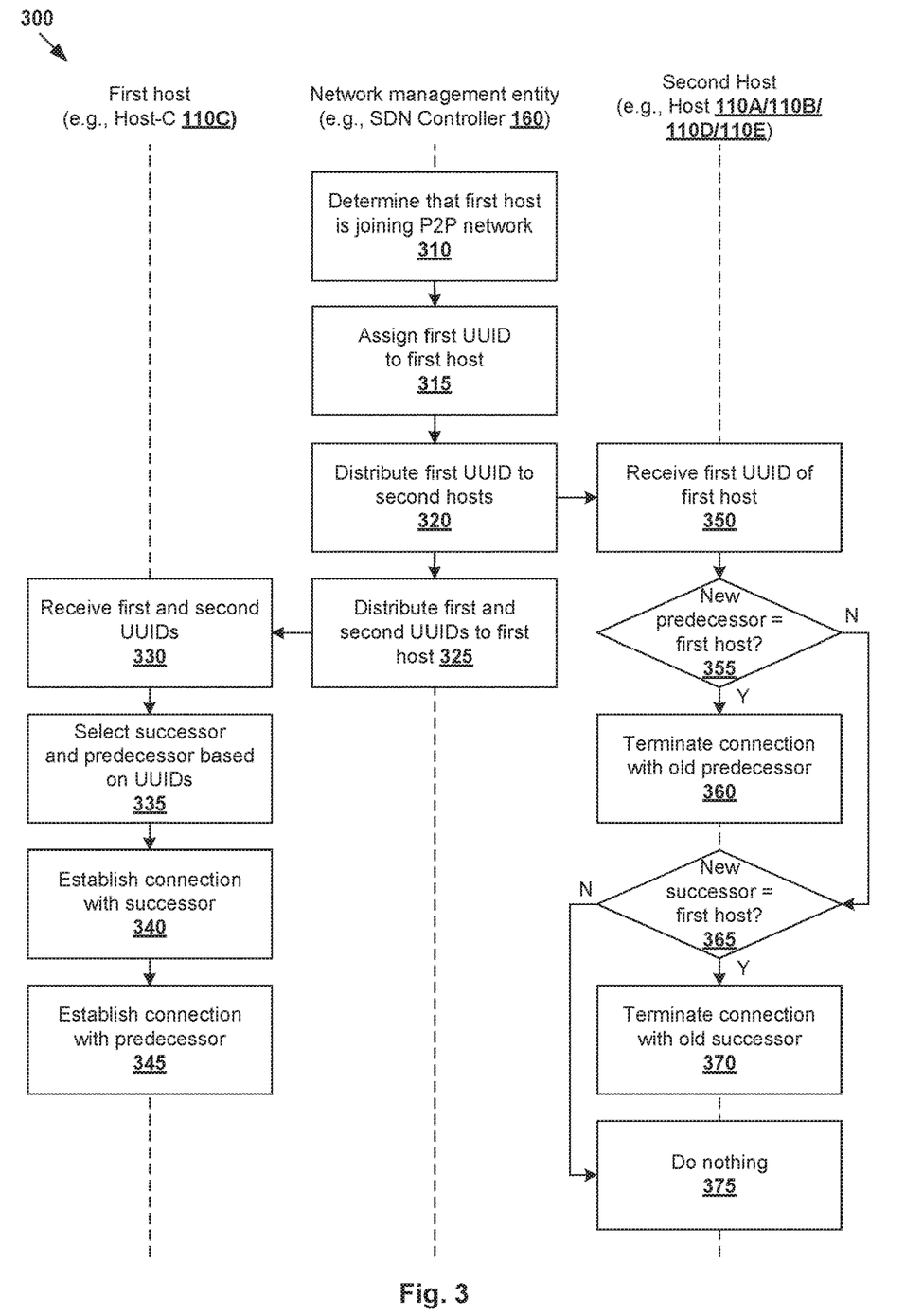
FIG. 3 is a flowchart of an example process for joining a peer-to-peer (P2P) network.

FIG. 3 is a flowchart of example detailed process 300 for joining P2P network 140. Example process 300 may include one or more operations, functions, or actions illustrated by one or more blocks, such as 305 to 375. The various blocks may be combined into fewer blocks, divided into additional blocks, and/or eliminated depending on the desired implementation. FIG. 3 will be explained using FIG. 4, which is a schematic diagram 400 illustrating a first host joining P2P network 140.

In the following, host-C 110C will be used as an example "first host"; host-A 110A, host-B 110B, host-D 110D, and host-E 110E as example "second hosts"; and SDN controller 160 as an example "network management entity." Example process 300 may be implemented by host 110A/110B/110C/110D/110E, such as using LCP agent 118A/118B/118C/118D/118E supported by hypervisor 114A/114B/114C/114D/114E, and implemented by SDN controller 160 using CCP module 162, etc. For simplicity, virtual machines and hardware components associated with host-D 110D and host-E 110E are not shown in FIG. 4.

Consider the scenario where host-A 110A, host-B 110B, host-D 110D and host-E 110E are existing members of P2P network 140. According to 310 and 315 in FIG. 3, in response to determination that host-C 110C is joining P2P network 140, SDN controller 160 assigns a unique identifier (ID) to host-C 110C. For example, host-C 110C may be assigned with ID=UUID-C, which represents a universally unique identifier (UUID) that ensures unambiguous identification of host-C 110C.

Figure 4:
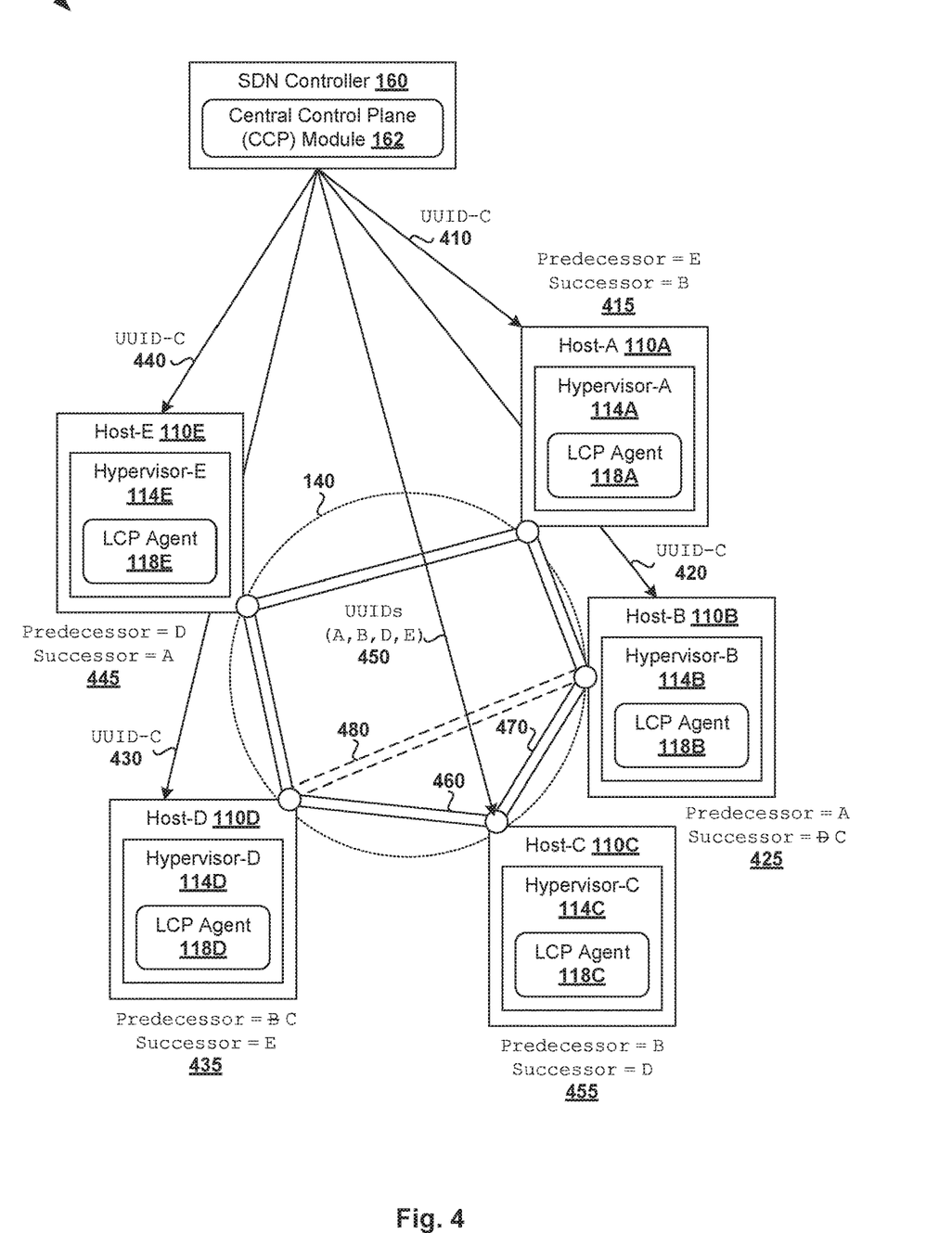
FIG. 4 is a schematic diagram illustrating a first host joining a P2P network.

In the example in FIG. 4, P2P network 140 is implemented using a chord network, which is a relatively robust and self-organizing structured P2P architecture. Using a consistent hashing algorithm, hosts 110A-110E may arrange themselves on a ring network topology based on their respective UUIDs. For example, based on key=hash(UUID) that is mappable to a circular key space, each host may select its successor and predecessor on P2P network 140.

According to 320 in FIG. 3, SDN controller 160 sends UUID-C associated with host-C 110C to the existing members. As shown in FIG. 4, UUID-C is sent to host-A 110A (see 410 in FIG. 4), host-B 110B (see 420 in FIG. 4), host-D 110D (see 430 in FIG. 4) and host-E 110E (see 440 in FIG. 4). Further, according to 325 in FIG. 3, SDN controller 160 sends (UUID-A, UUID-B, UUID-C, UUID-D, UUID-E) to host-C 110C (see 450 in FIG. 4).

According to 330 and 335 in FIG. 3, in response to receiving (UUID-A, UUID-B, UUID-C, UUID-D, UUID-E), host-C 110C compares the UUIDs to determine successor=hypervisor-D 110D and predecessor=host-B 110B (see 455 in FIG. 4). For example, this may involve calculating and comparing hash(UUID-A), hash(UUID-B), hash(UUID-C), hash(UUID-D) and hash(UUID-E). According to 340 and 345 in FIG. 3, host-C 110C then merges into P2P network 140 by establishing a first connection with successor=host-D 110D (see 460 in FIG. 4) and a second connection with predecessor=host-B 110B (see 470 in FIG. 4).

According to 350, 355 and 360 in FIG. 3, in response to receiving UUID-C from SDN controller 160, host-D 110D determines that its predecessor has changed from host-B 110B to new member host-C 110C (see 435 in FIG. 4) and proceeds to terminate its connection with host-B 110B (see 480 in FIG. 4).

According to 350, 365 and 370 in FIG. 3, in response to receiving UUID-C, host-B 110B determines that its successor has changed to new member host-C 110C (see 425 in FIG. 4) and terminates its connection with host-D 110D (if not already terminated; see 480 in FIG. 4).

According to 350 and 375 in FIG. 3, host-A 110A and host-E 110E are unaffected. For example, host-A 110A remains associated with successor=host-B 110B and predecessor=host-E 110E (see 415 in FIG. 4). Host-E 110E is associated with successor=host-A 110A and predecessor=host-D 110D (see 445 in FIG. 4).

In practice, a connection between a pair of hosts (more specifically, hypervisors) may be established using any suitable protocol, such as transmission control protocol (TCP), user datagram protocol (UDP), etc. In another example, a pair of hypervisors may use any suitable tunneling protocol to communicate with each other, such as VXLAN, STT, GENEVE, etc. When a host leaves P2P network 140, SDN controller 160 will notify the remaining hosts to recalculate their predecessor and successor, and update connection(s) where applicable.

Obtaining Control Information Via P2P Network

Figure 5:
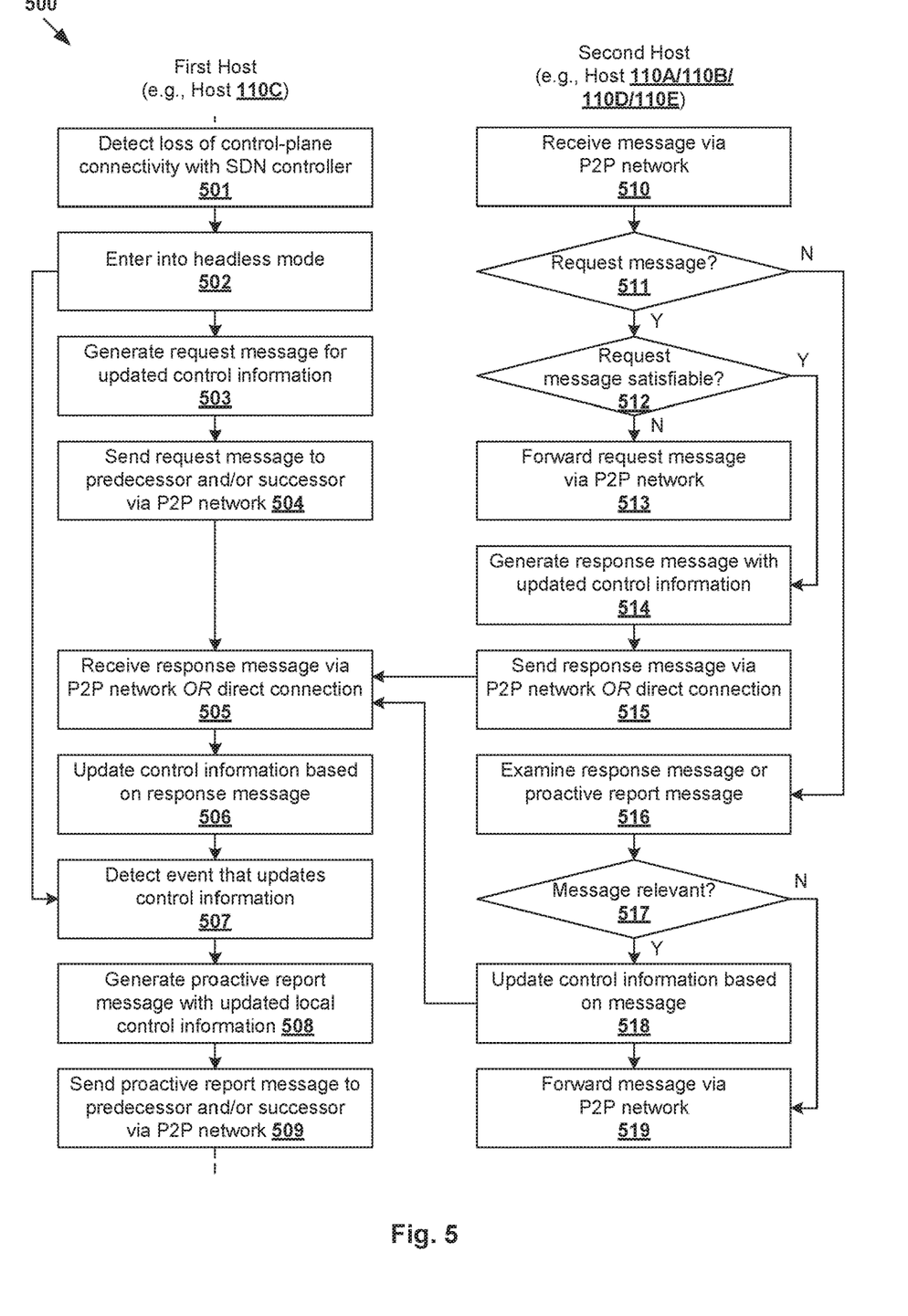
FIG. 5 is a flowchart of example detailed process for handling control-plane connectivity loss in virtualized computing environment.

FIG. 5 is a flowchart of example detailed process 500 for handling control-plane connectivity loss in virtualized computing environment 100. Example process 500 may include one or more operations, functions, or actions illustrated by one or more blocks, such as 501 to 519. The various blocks may be combined into fewer blocks, divided into additional blocks, and/or eliminated depending on the desired implementation. Host 110A/110B/110C/110D/110E may implement the following examples using LCP agent 118A/118B/118C/118D/118E supported by hypervisor 114A/114B/114C/114D/114E.

(a) Lookup-Based Approach

In a first example, a lookup-based approach will be explained using FIG. 5 and FIG. 6, which is a schematic diagram illustrating example lookup-based approach 600 for handling control-plane connectivity loss according to the example in FIG. 5.

According to 501 and 502 in FIG. 5, in response to detecting a loss of control-plane connectivity with SDN controller 160, host-C 110C enters into a headless mode. In one example, this may involve detecting a disconnection of a control channel (e.g., TCP connection) between LCP agent 118C and SDN controller 160. In another example, the loss of control-plane connectivity may also be due to a failure (e.g., power, hardware, software, etc.) at a physical switch or router connecting host-C 110C with SDN controller 160. Host-C 110C may reattempt to reconnect with SDN controller 160 for a predetermined number of retries or predetermined amount of time before deciding that control-plane connectivity is lost.

According to 503 and 504 in FIG. 5, host-C 110C generates a request message to request for control information, and sends the request message via P2P network 140. In practice, control information may be maintained by LCP agent 118C in the format of <ID, message, revision> format, where ID is an indexing key, message is a serialized message that includes all properties associated with message ID, and revision represents the latest version number. Control information relating to traffic forwarding may be maintained in a forwarding information base (FIB), etc.

Figure 6:
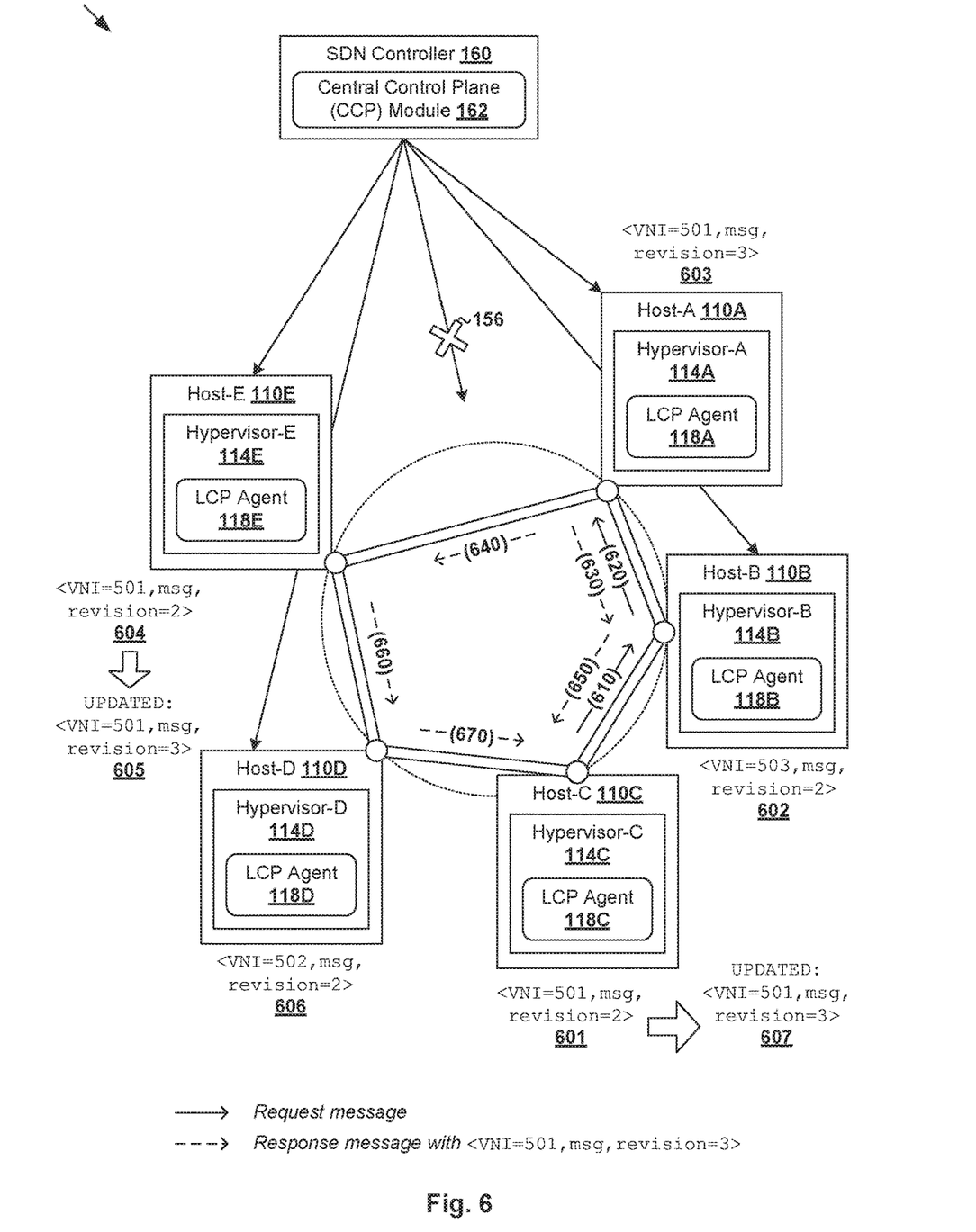
FIG. 6 is a schematic diagram illustrating an example lookup-based approach for handling control-plane connectivity loss according to the example in FIG. 5.

In the example in FIG. 6, host-C 110C has entered into a headless mode after detecting a loss of control-plane connectivity with SDN controller 160 (see 156 in FIG. 6). Referring to 601 in FIG. 6, host-C 110C currently has a particular version of control information <VNI=501, message, revision=2> and wishes to obtain a newer version of the control information (i.e., revision >2). At 610 in FIG. 6, since host-C 110C is able to obtain the newer version from SDN controller 160 during the headless mode, host-C 110C generates and sends a request message that identifies VNI=501 and revision=2 to its predecessor=host-B 110B via P2P network 140.

The request message triggers other hosts on P2P network 140 to either send a response message (if the request message can be satisfied), or forward the request message via P2P network 140 according to blocks 510 to 519 in FIG. 5. At host-B 110B, in response to receiving the request message via P2P network 140, host-B 110B determines that it cannot satisfy the request message (i.e., it does not have the requested VNI=501, revision >2) according to 510, 511 and 512 in FIG. 5. Instead, as shown at 602 in FIG. 6, host-B 110B has control information <VNI=503, message, revision=2>. As such, according to 513 in FIG. 5, host-B 110B is triggered to forward the request message via P2P network to its predecessor=host-A 110A.

At host-A 110A, in response to receiving the request message via P2P network 140, host-A 110A determines that it is able to satisfy the request message according to 510, 511 and 512 in FIG. 5. In particular, as shown at 603 in FIG. 6, host-A 110A has control information <VNI=501, message, revision=3>. As such, the request message triggers host-A 110A to generate and send a response message with the control information via P2P network 140 according to 514 and 515 in FIG. 5. In the example in FIG. 6, host-A 110A echoes or floods the response message within P2P network 140 by sending the response message to both its successor=host-B 110B (see 630 in FIG. 6) and predecessor=host-E 110E (see 640 in FIG. 6).

Next, host-B 110B receives and examines the response message from host-A 110A according to 510, 511 and 516 in FIG. 5. In response to determination that the response message is not relevant (e.g., not interested in VNI=501), host-B 110B is triggered to forward the response message via P2P network 140 according to 517 and 519 in FIG. 5. In the example in FIG. 6, the response message is forwarded to successor=host-C 110C, which is the intended the recipient of the response message (see 650 in FIG. 6).

Host-E 110E also receives the response message from host-A 110A according to 510, 511 and 516 in FIG. 5. In this case, however, host-E 110E determines that the response message is relevant, and is triggered to synchronize or update its control information according to 517 and 518 in FIG. 5. In the example in FIG. 6, host-E 110E updates its control information from <VNI=501, message, revision=2> (see 604 in FIG. 6) to <VNI=501, message, revision=3> (see 605 in FIG. 6). Since host-E 110E is not the intended recipient, the response message is then forwarded via P2P network 140, this time from host-E 110E to host-D 110D (see 660 in FIG. 6).

Host-D 110D receives the response message from host-E 110E according to 510, 511 and 516 in FIG. 5. In response to determination that the response message is not relevant (e.g., not interested in VNI=501; see also 606 in FIG. 6), host-D 110D is triggered to forward the response message via P2P network 140 according to 517 and 519 in FIG. 5. In the example in FIG. 6, the response message is forwarded by host-D 110D to predecessor=host-C 110C, which is the intended the recipient of the response message (see 670 in FIG. 6).

Host-C 110C receives two copies of the response message sent by host-A 110A, i.e., one from host-B 110B (see 650 in FIG. 6) and another from host-D 110D (see 670 in FIG. 6). In response to receiving the response message, host-C 110C updates its control information from <VNI=501, message, revision=2> (see 601 in FIG. 6) to <VNI=501, message, revision=3> (see 607 in FIG. 6) according to 505 and 506 in FIG. 5. Using the examples in FIG. 5 and FIG. 6, host-C 110C is able to update its control information even when it has lost control-plane connectivity with SDN controller 160.

(b) Flooding-Based Approach

In a second example, a flooding-based approach will be explained using FIG. 5 and FIG. 7, which is a schematic diagram illustrating example flooding-based approach 700 for handling control-plane connectivity loss according to the example in FIG. 5.

Similar to the example in FIG. 6, host-C 110C enters into a headless mode in response to detecting a loss of control-plane connectivity with SDN controller 160 according to 501 and 502 in FIG. 5. Host-C 110C host-C 110C currently has a particular version of control information <VNI=501, message, revision=2> (see 701 in FIG. 7) and wishes to obtain a newer version of the control information. According to 503 and 504 in FIG. 5, a request message is generated and sent via P2P network 140.

In contrast to the lookup-based approach in FIG. 6, host-C 110C may multicast the request message by sending it in both directions. In the example in FIG. 7, host-C 110C sends a first request message to predecessor=host-B 110B (see 710 in FIG. 7) and a second request message to successor=host-D 110D (see 720 in FIG. 7), which has the effect of flooding P2P network 140 from both directions. The request message may be forwarded until it reaches a (healthy) host that is able to satisfy the request message.

At host-B 110B, in response to receiving the first request message from host-C 110C via P2P network 140, host-B 110B determines that it does not have the requested control information (i.e., VNI=501, revision >2) according to 510, 511 and 512 in FIG. 5. Instead, as shown at 702 in FIG. 7, host-B 110B has control information <VNI=503, message, revision=2>. As such, according to 513 in FIG. 5, host-B 110B is triggered to forward the request message via P2P network 140 to its predecessor=host-A 110A (see 730 in FIG. 7).

At host-D 110D, in response to receiving the second request message from host-C 110C via P2P network 140, host-D 110D determines that it does not have the requested control information (i.e., VNI=501, revision >2) according to 510, 511 and 512 in FIG. 5. Instead, as shown at 703 in FIG. 7, host-D 110D has control information <VNI=502, message, revision=2>. According to 513 in FIG. 5, host-D 110D is triggered to forward the request message to its predecessor=host-E 110E (see 740 in FIG. 7).

At host-E 110E, in response to receiving the request message from host-D 110D via P2P network 140, host-E 110E determines that it does not have the requested control information according to 510, 511 and 512 in FIG. 5. Instead, as shown at 704 in FIG. 7, its control information is the same version as that of host-C 110C, i.e., <VNI=501, message, revision=2>. According to 513 in FIG. 5, host-E 110E is triggered to forward the request message to predecessor=host-A 110A (see 750 in FIG. 7).

Figure 7:
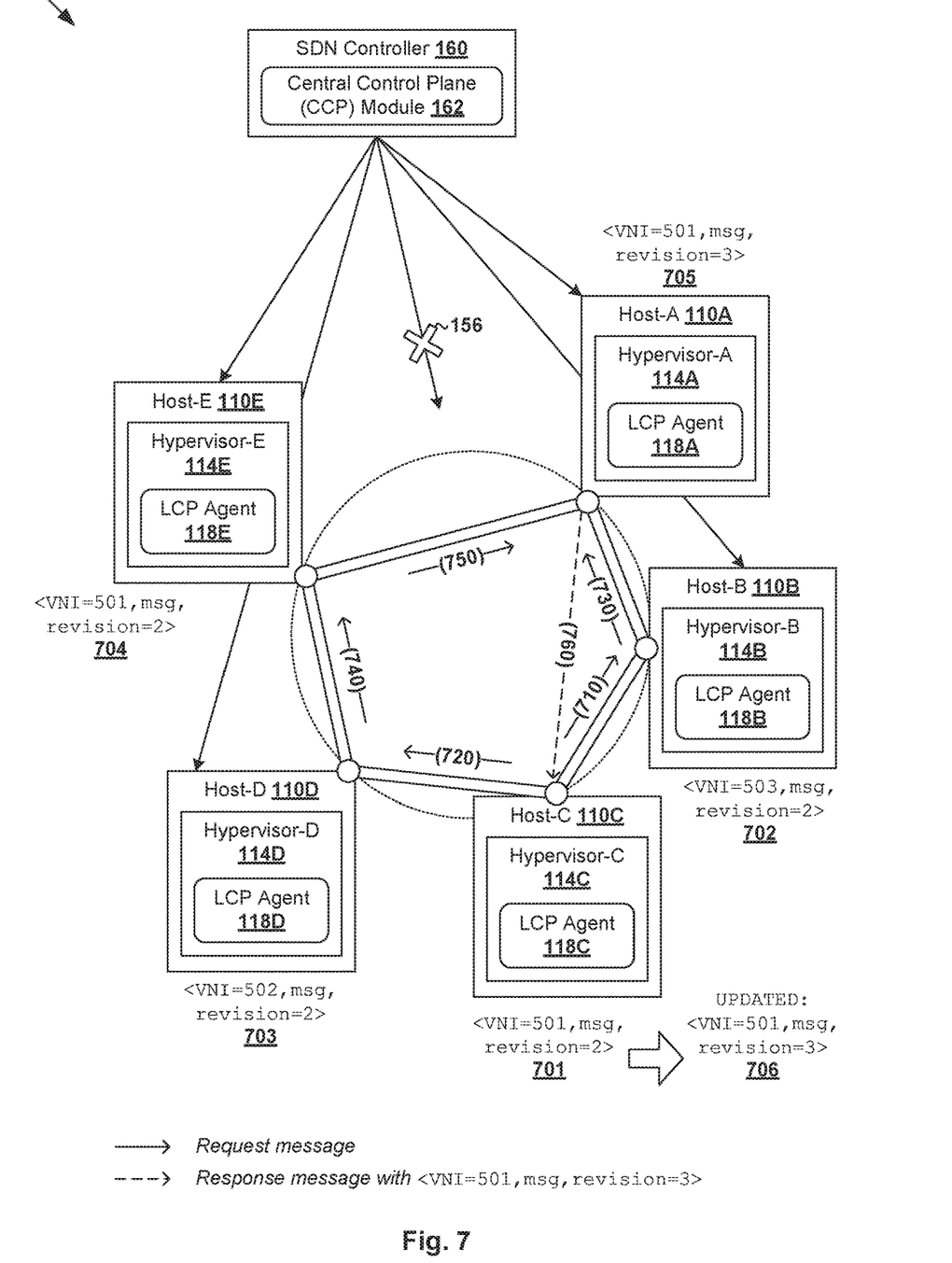
FIG. 7 is a schematic diagram illustrating an example flooding-based approach for handling control-plane connectivity loss according to the example in FIG. 5.
Figure 8:
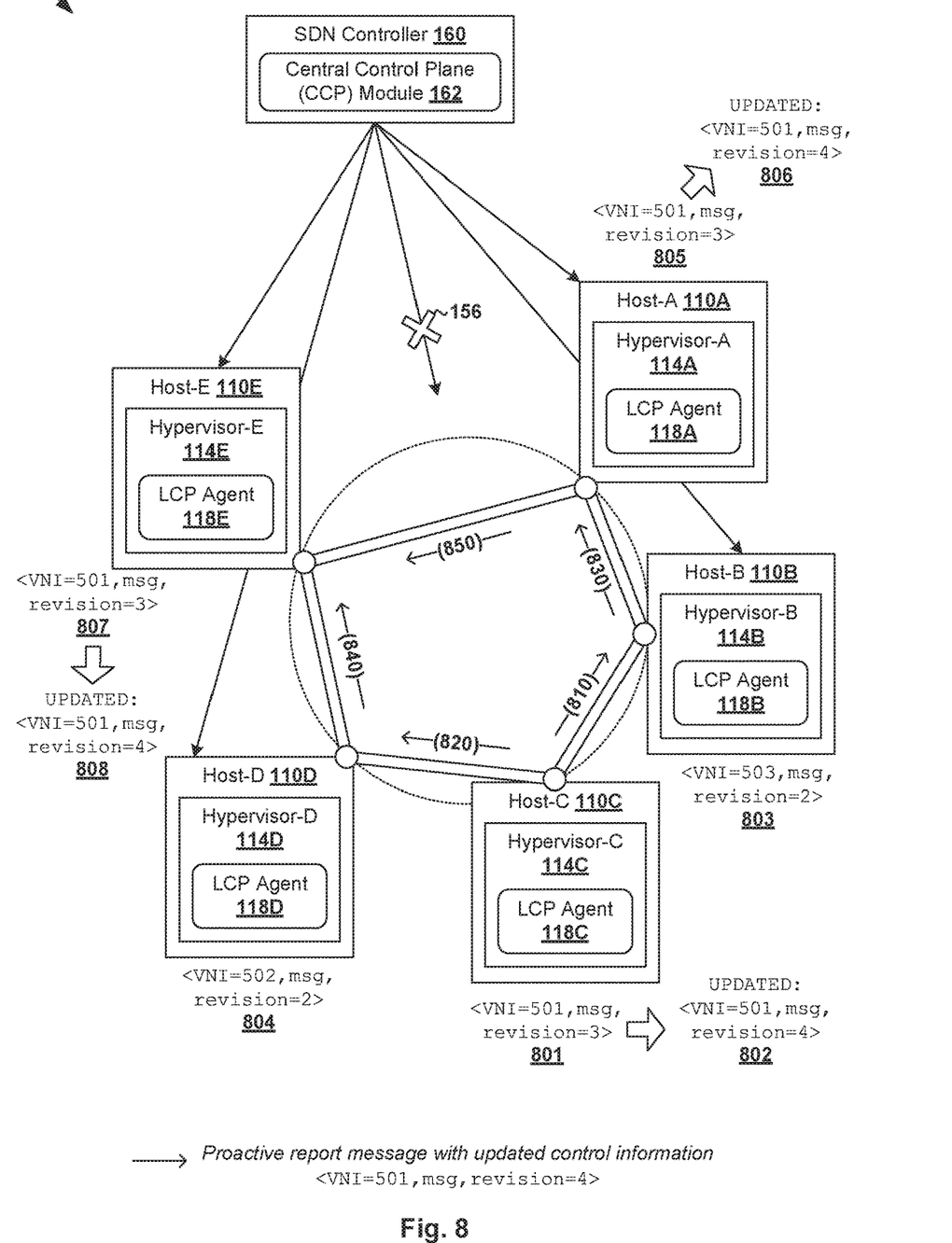
FIG. 8 is a schematic diagram illustrating an example of a first host pushing control information to second hosts via a P2P network.

Host-A 110A receives two copies of the request message sent by host-C 110C, i.e., one via host-B 110B (see 730 in FIG. 7) and another via host-E 110E (see 750 in FIG. 7). In response to receiving the request messages, host-A 110A determines that it has the requested control information according to 510, 511 and 512 in FIG. 5. In particular, host-A 110A has the requested <VNI=501, message, revision=3> (see 705 in FIG. 7).

Since host-A 110A is able to satisfy the request message, a response message with the requested control information is generated and sent according to 514 and 515 in FIG. 5. In contrast to the lookup-based approach in FIG. 6, however, host-A 110A sends the response message to host-C 110C via a direct connection between them (see 760 in FIG. 7). For example, this may involve host-A 110A establishing a transient connection (e.g., using TCP, UDP, etc.) with host-C 110C prior to sending the response message.

Host-C 110C receives the response message sent by host-A 110A via the connection between them. In response to receiving the response message, host-C 110C updates its control information from <VNI=501, message, revision=2> (see 701 in FIG. 7) to newer version <VNI=501, message, revision=3> (see 706 in FIG. 7) according to 505 and 506 in FIG. 5.

Using the examples in FIG. 5 and FIG. 7, host-C 110C can continue to obtain updated control information even when it has lost control-plane connectivity with SDN controller 160. In general, a lookup operation within a chord network contacts O(log N) nodes to complete a query in an N-node network. Depending on the desired implementation, the flooding-based approach in FIG. 7 may achieve better latency than the lookup-based approach in FIG. 6 in some cases. In particular, since host-A 110A utilizes a direct connection, host-C 110C may receive the updated control information faster, especially when the response message has to travel through many hops in a P2P network with a large number of hosts. However, the latency and overheads associated with establishing the connection should be taken into account when choosing one approach over another.

Also, according to the flooding-based approach, other hosts (e.g., host-B 110B and host-D 110D) that are not interested in the requested control information do not have to process the response message. However, this also means that host-E 110E will not be able to snoop on the response message from host-A 110A to updates it control information <VNI=501, message, revision=2> (see 704 in FIG. 7). Assuming that host-E 110E has control-plane connectivity with SDN controller 160, the control information should be updated to revision=3 in due course.

Otherwise, if the control-plane connectivity is lost, host-E 110E may enter into the headless mode and send a request message in a similar manner as explained above. In this case, host-C 110C may also function as both a "first host" (since it is also headless) according to blocks 501 to 509 in FIG. 5, and a "second host" (since it may be triggered to forward a request message from host-E 110E or send a response message with the requested control information) according to blocks 510-519 in FIG. 5. This way, P2P network 140 may be utilized by multiple hosts operating in the headless mode to update their control information.

It should be understood that various modifications may also be made to the examples discussed. For example in FIG. 6, instead of sending the request message to predecessor=host-B 110B, host-C 110C may select successor=host-D 110D as its first lookup destination instead. In this case, the request message will travel in a clockwise direction to reach host-A 110A, which generates and sends the response message. Host-A 110A may then send the respond message in both directions via its predecessor=host-E 110E, successor=host-B 110B, or both, to reach host-C 110C. Alternatively, similar to the example in FIG. 7, the response message may be sent via a direct connection between host-A 110A and host-C 110C.

Further, host-C 110C may send a single request message to request for multiple sets of control information for simultaneous synchronization of multiple states, e.g., associated with VNI=501, VNI=504, etc. Different types of control information may be requested, such as protocol-to-hardware address mapping information, firewall rules, etc. A response message may also include multiple sets of control information. In some cases, the control information may be obtained from multiple response messages. For example, host-A 110A may send a first response message associated with VNI=501, while another host (say host-E 110E) sends a second response message associated with VNI=504.

Proactive Report Message

According to examples of the present disclosure, P2P network 140 may be used to push control information in a proactive manner. An example will be explained using FIG. 5 (see blocks 507, 508 and 509) and FIG. 8, which is a schematic diagram illustrating example 800 of a first host pushing control information to second hosts via P2P network 140.

Referring first to FIG. 5, at 507, host-C 110C detects an event that causes an update to its control information. In the example in FIG. 8, control information associated with VXLAN501 is updated from <VNI=501, message, revision=3> (see 801 in FIG. 8) to <VNI=501, message, revision=4> (see 802 in FIG. 8). For example, the detected event associated with VXLAN501 may be the powering ON/OFF of a virtual machine located on VXLAN501 (e.g., VM7, not shown for simplicity), migration of a virtual machine (e.g., VM7) located on VXLAN501, changes to IP-to-MAC address mapping information, etc.

Since host-C 110C has lost control-plane connectivity with SDN controller 160, host-C 110C is not able to push the updated control information to SDN controller 160 for dissemination to other hosts. As such, according to 508 and 509 in FIG. 5, host-C 110C generates and sends a proactive report message to report the update via P2P network 140. In the example in FIG. 8, the proactive report message is sent by host-C 110C to both its predecessor=host-B 110B (see 810 in FIG. 8) and successor=host-D 110D (see 820 in FIG. 8).

Each host on P2P network 140 may process the proactive report message according to blocks 510-511 and 516-519 in FIG. 5. Host-B 110B receives the proactive report message from host-C 110C according to 510, 511 and 516 in FIG. 5. In response to determination that the proactive report message is not relevant (e.g., not interested in VNI=501; see 803 in FIG. 8), the proactive report message is forwarded via P2P network 140 according to 517 and 519 in FIG. 5. In the example in FIG. 8, the proactive report message is forwarded to predecessor=host-A 110A (see 830 in FIG. 8).

Similarly, host-D 110D also receives the proactive report message from host-C 110C according to 510, 511 and 516 in FIG. 5. In response to determination that the proactive report message is not relevant (e.g., not interested in VNI=501; see also 804 in FIG. 8), host-D 110D forwards the proactive report message via P2P network 140 according to 517 and 519 in FIG. 5. In the example in FIG. 8, the proactive report message is forwarded to successor=host-E 110E (see 840 in FIG. 8).

At host-A 110A, the proactive report message is received and determined to be relevant according to 510, 511, 516 and 517 in FIG. 5. The proactive report message triggers host-A 110A to update control information <VNI=501, message, revision=3> (see 805 in FIG. 8) to <VNI=501, message, revision=4> (see 806 in FIG. 8) based on the proactive report message. The proactive report message is then forwarded via P2P network 140 to predecessor=host-E 110E according to 518 in FIG. 8.

At host-E 110E, the proactive report message is also received and determined to be relevant according to 510, 511, 516 and 517 in FIG. 5. The proactive report message triggers host-E 110E to update control information <VNI=501, message, revision=3> (see 807 in FIG. 8) to <VNI=501, message, revision=4> (see 808 in FIG. 8). Since host-E 110E receives two copies of the proactive report message (i.e., one from host-A 110A and another from host-D 110D), it may stop forwarding the proactive report message within P2P network 140.

It should be understood that, in practice, multiple hosts (e.g., host-C 110C and host-E 110E) may be operating in the headless mode simultaneously. According to examples of the disclosure, such headless hosts may continue to obtain updated control information distributed by SDN controller 160 from other "non-headless" hosts (e.g., host-A 110A, host-B 110B and host-D 110D), or push updated control information to such non-headless hosts. Depending on the desired implementation, a set of hosts may be interested in the same control information for various reasons, such as when they support virtual machines that are attached to the same layer-2 logical switch, logical router, etc. In this case, control information may be synchronized among hosts in the set via P2P network 140 to reduce the burden of SDN controller 160.

In an extreme case where all hosts 110A-110E become headless (e.g., due to a failure at SDN controller 160), they may continue to synchronize their control information via P2P network 140 until SDN controller 160 recovers from the failure. In this case, the examples in FIG. 3 and FIG. 4 may also be enhanced to enable a host to join or leave P2P network 140 without any assistance from SDN controller 160, such as using pure P2P node identification, etc.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8. For example, a computer system may be deployed in virtualized computing environment 100 to perform the functionality of a network management entity (e.g., SDN controller 160), or host 110A/110B/110C/110D/110E.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first host to handle control-plane connectivity loss in a virtualized computing environment that includes the first host, multiple second hosts and a network management entity, wherein the method comprises:

joining a peer-to-peer network that includes the multiple second hosts by receiving, from the network management entity, a first identifier associated with the first host and multiple second identifiers associated with respective multiple second hosts;

prior to detecting a loss of control-plane connectivity between the first host and the network management entity, establishing a first connection with a predecessor on the peer-to-peer network and a second connection with a successor on the peer-to-peer network, wherein the predecessor and the successor are selected from the multiple second hosts based on the first identifier and the multiple second identifiers;

detecting the loss of control-plane connectivity between the first host and the network management entity;

generating a request message for control information that the first host is unable to obtain from the network management entity in response to the loss of control-plane connectivity;

sending the request message to the predecessor or the successor, or both, via the peer-to-peer network that connects the first host with the multiple second hosts to trigger the predecessor or the successor, or both, to either send a response message in response to determination that the predecessor or the successor, or both, have obtained the control information prior to receiving the request message, or otherwise forward the request message via the peer-to-peer network; and obtaining the control information from at least one of the multiple second hosts.

2. The method of claim 1, wherein the method further comprises:

obtaining the control information via the predecessor or successor on the peer-to-peer network.

3. The method of claim 1, wherein the method further comprises:

obtaining the control information via a direct connection between the first host and the at least one of the multiple second hosts.

4. The method of claim 1, wherein the method further comprises:

in response to detecting an event that causes an update to the control information, generating a proactive report message to report the update to the multiple second hosts; and sending the proactive report message via the peer-to-peer network.

5. A non-transitory computer-readable storage medium that includes a set of instructions which, in response to execution by a processor of a first host, cause the processor to perform a method of handling control-plane connectivity loss in a virtualized computing environment that includes the first host, multiple second hosts and a network management entity, wherein the method comprises:

joining a peer-to-peer network that includes the multiple second hosts by receiving, from the network management entity, a first identifier associated with the first host and multiple second identifiers associated with respective multiple second hosts;

prior to detecting a loss of control-plane connectivity between the first host and the network management entity, establishing a first connection with a predecessor on the peer-to-peer network and a second connection with a successor on the peer-to-peer network, wherein the predecessor and the successor are selected from the multiple second hosts based on the first identifier and the multiple second identifiers;

detecting the loss of control-plane connectivity between the first host and the network management entity;

generating a request message for control information that the first host is unable to obtain from the network management entity in response to the loss of control-plane connectivity;

sending the request message to the predecessor or the successor, or both, via the peer-to-peer network that connects the first host with the multiple second hosts to trigger the predecessor or the successor, or both, to either send a response message in response to determination that the predecessor or the successor, or both, have obtained the control information prior to receiving the request message, or otherwise forward the request message via the peer-to-peer network; and obtaining the control information from at least one of the multiple second hosts.

6. The non-transitory computer-readable storage medium of claim 5, wherein the method further comprises:

obtaining the control information via the predecessor or successor on the peer-to-peer network.

7. The non-transitory computer-readable storage medium of claim 5, wherein the method further comprises:

obtaining the control information via a direct connection between the first host and the at least one of the multiple second hosts.

8. The non-transitory computer-readable storage medium of claim 5, wherein the method further comprises:

in response to detecting an event that causes an update to the control information, generating a proactive report message to report the update to the multiple second hosts; and sending the proactive report message via the peer-to-peer network.

9. A first host configured to handle control-plane connectivity loss in a virtualized computing environment that includes the first host, multiple second hosts and a network management entity, comprising:

a processor; and a non-transitory computer-readable medium having stored thereon instructions that, when executed by the processor, cause the processor to:

join a peer-to-peer network that includes the multiple second hosts by receiving, from the network management entity, a first identifier associated with the first host and multiple second identifiers associated with respective multiple second hosts;

prior to detecting a loss of control-plane connectivity between the first host and the network management entity, establish a first connection with a predecessor on the peer-to-peer network and a second connection with a successor on the peer-to-peer network, wherein the predecessor and successor are selected from the multiple second hosts based on the first identifier and the multiple second identifiers;

detect the loss of control-plane connectivity between the first host and the network management entity;

generate a request message for control information that the first host is unable to obtain from the network management entity in response to the loss of control-plane connectivity;

send the request message to the predecessor or the successor, or both, via the peer-to-peer network that connects the first host with the multiple second hosts to trigger the predecessor or the successor, or both, to either send a response message in response to determination that the predecessor or the successor, or both, have obtained the control information prior to receiving the request message, or otherwise forward the request message via the peer-to-peer network; and obtain the control information from at least one of the multiple second hosts.

10. The first host of claim 9, wherein the instructions further cause the processor to:

obtain the control information via the predecessor or successor on the peer-to-peer network.

11. The first host of claim 9, wherein the instructions further cause the processor to:

obtain the control information via a direct connection between the first host and the at least one of the multiple second hosts.

12. The first host of claim 9, wherein the instructions further cause the processor to:
in response to detecting an event that causes an update to the control information, generate a proactive report message to report the update to the multiple second hosts; and sending the proactive report message via the peer-to-peer network.

* * * * *